April 2, 1946.  H. W. TAUSCH  2,397,818
METHOD AND APPARATUS FOR CONCENTRATING COLLOIDAL DISPERSIONS
Filed Nov. 6, 1944  2 Sheets-Sheet 2
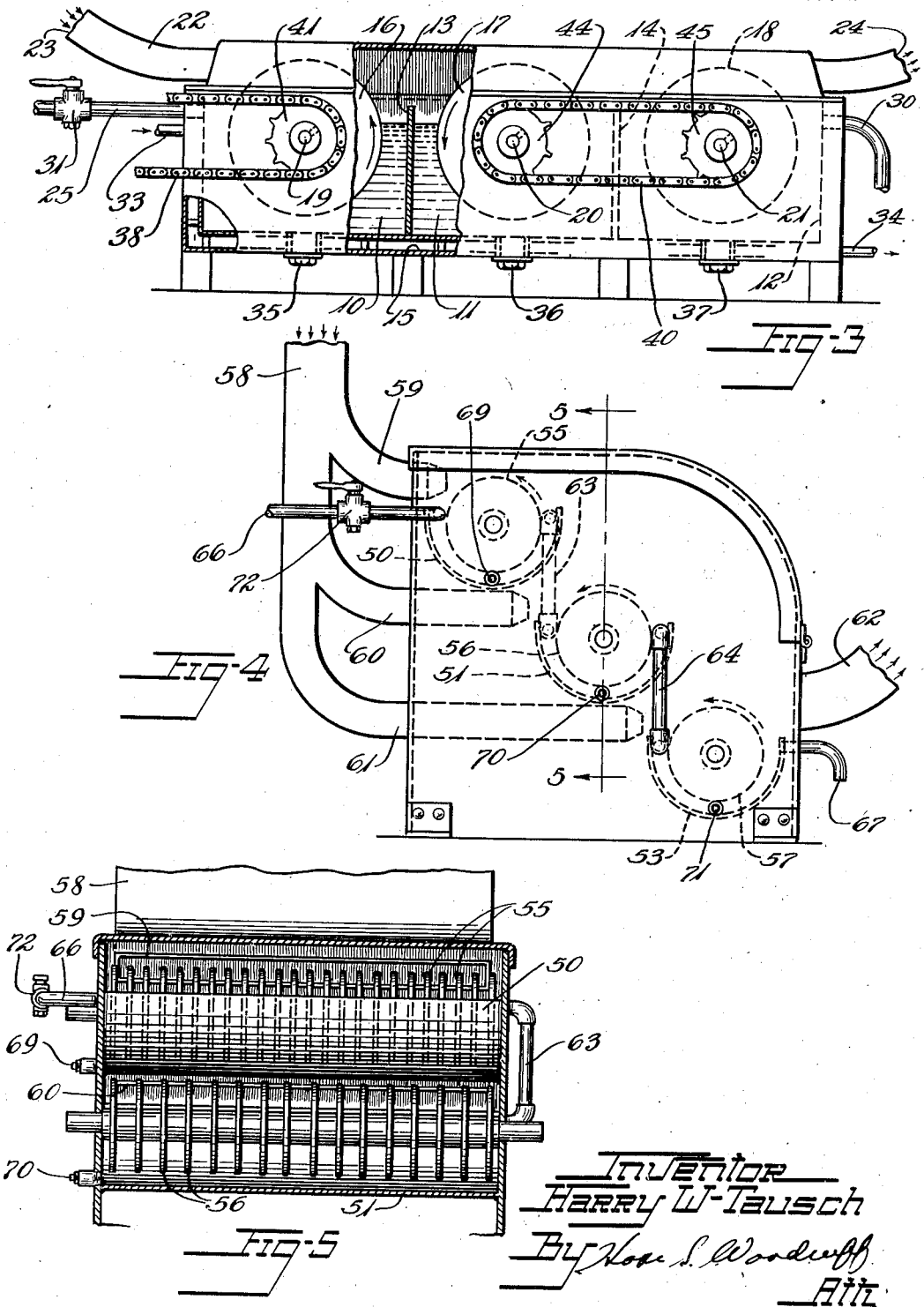

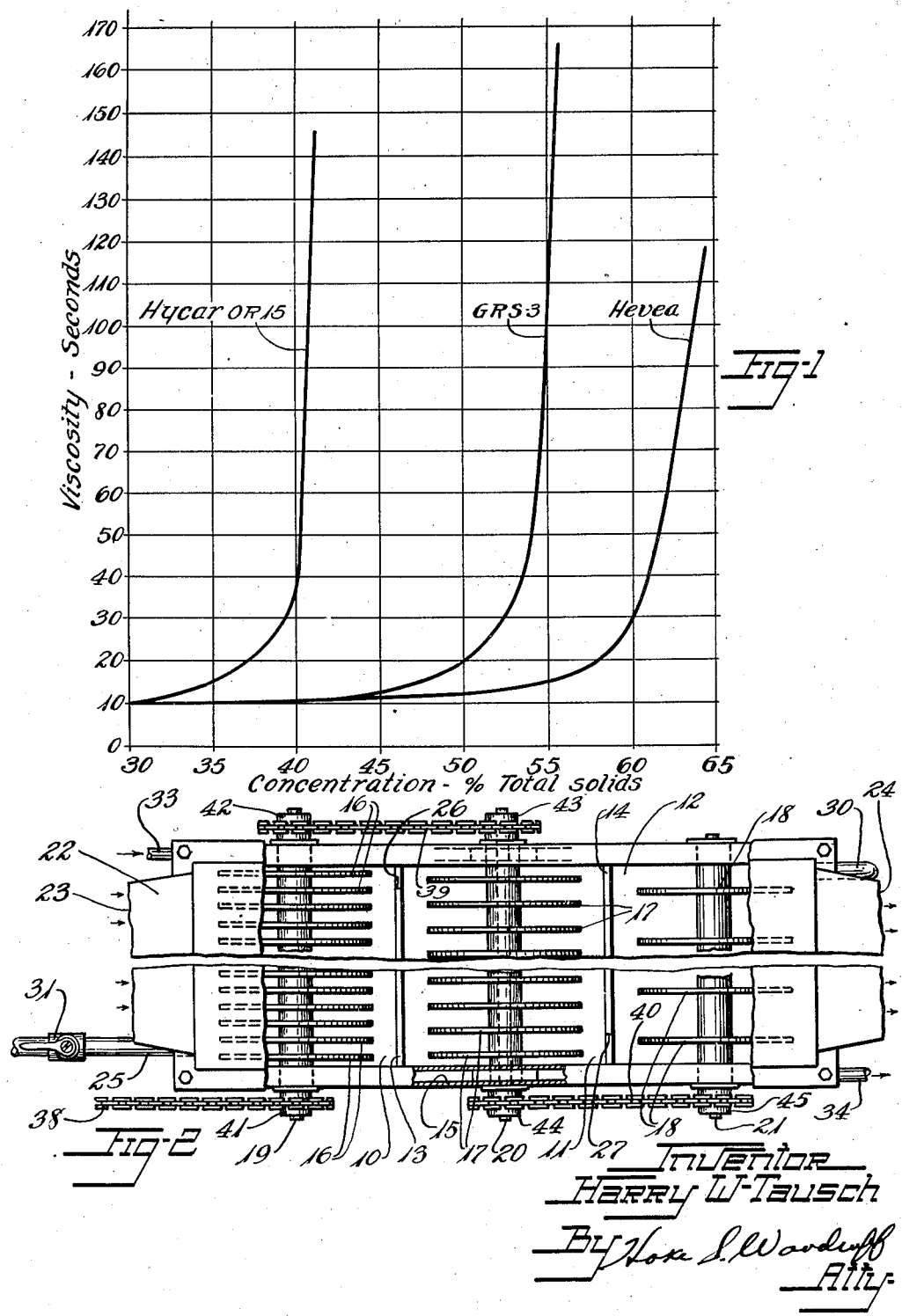

Patented Apr. 2, 1946

2,397,818

UNITED STATES PATENT OFFICE 2,397,818

METHOD AND APPARATUS FOR CONCENTRATING COLLOIDAL DISPERSIONS

Harry W. Tausch, Akron, Ohio, assignor to American Anode Inc., Akron, Ohio, a corporation of Delaware Application November 6, 1944, Serial No. 562,202

12 Claims. (Cl. 159—9)

This invention relates to the concentration of aqueous dispersions of colloidally dispersed substances including such dispersions as the latices of natural and synthetic rubbers, and especially to the concentration of such dispersions by evaporating water therefrom on moving surfaces.

A number of processes have been proposed for the concentration of such dispersions as rubber latices by repeatedly immersing surfaces in the dispersion and alternately exposing the surfaces to evaporative conditions as by partially immersing rotating discs in the dispersion and passing warm air over the exposed surfaces. Several embodiments of these proposed processes have been disclosed. However, all of these processes or embodiments are possessed of low evaporative efficiencies, high labor costs, limitations as to the range of concentrations that can be handled, and of difficulty of operation.

With increased use of relatively concentrated latices and latex pastes in the coating and dipping methods of rubber manufacture, and especially in the use of latex concentrates of synthetic rubbers, it has become imperative that a method be found by which a wide variety of latices may be concentrated to suitably high concentrations, quickly and cheaply, and in sufficient quantity.

The purpose of this invention accordingly is to provide apparatus for and methods of concentration which will overcome the above-mentioned defects and make possible volume output of latex concentrates both of natural and synthetic rubbers. More specifically, the invention aims to provide continuous methods and apparatus for evaporatively concentrating dispersions in a simple, economical and efficient manner.

As a result of extensive experimentation I have discovered that it is impossible to achieve any substantial increase in concentration while operating continuously in known evaporating equipment of the character indicated. In the present invention I propose to overcome this difficulty by performing the evaporation of rubber dispersions or the like on a plurality of sets of rotating discs or other moving surfaces at spaced apart zones in a latex containing means while maintaining the zones substantially segregated, and also maintaining a constant unidirectional flow through the several zones, thereby permitting the introduction of a dilute latex stream adjacent one zone and the withdrawal of a concentrated latex stream adjacent another such zone without blending the dilute stream with a relatively concentrated stream of dispersion. I have found that this method is capable of continuously producing dispersions of materially higher concentrations than has been possible in prior methods.

I have further found that the efficiency of the concentration can be additionally increased and still more highly concentrated dispersions produced if the discs or other evaporating surfaces are arranged with progressively increased spacings in the successive zones. This added feature of the invention is based on the observed fact that the viscosity of a dispersion does not increase, as might be expected, in direct proportion to the increase in concentration, but rather that the viscosity increases little if any in the earlier stages of concentration but very rapidly in the later stages. Such relationship may better be understood by reference to Fig. 1 of the accompanying drawing which shows graphically the relationship between viscosity and concentration for three typical rubber dispersions, namely, natural Hevea latex, GR–S–3 latex (a butadiene-styrene synthetic latex) and Hycar OR–15 (a butadiene-acrylonitrile synthetic latex).

It will be observed from Fig. 1 that before any significant increase in viscosity is experienced the major part of the concentration will have taken place. In the present invention I propose to provide substantially greater surface area to quickly remove the major portion of the water by spacing the evaporating surfaces relatively closer in the concentration zone which contains such relatively dilute dispersion. This proposal, I have found, will effect surprisingly large increases in the output of a rotating disc concentrator.

If the same substantially close spacing of evaporating surfaces should be provided to concentrate the relatively concentrated dispersion as is provided to concentrate the relatively dilute dispersion, a serious limitation would result in the range of concentrations that could be handled because in the later stages of concentration, surfaces spaced relatively close together would be bridged by the relatively viscous dispersion with the formation of solid layers of dispersion between the surfaces. In the present invention I propose to space the surfaces of each set of rotating surfaces progressively farther apart as concentration progresses with consequent viscosity increase. This latter proposal I have found enables a rotating-disc concentrator to concentrate dispersions of widely varying concentrations to desirably high final concentrations.

I have found that it is possible to concentrate a dilute latex to substantially the middle of the up-sweeping portion of the curve of viscosity versus concentration as shown in Fig. 1 by using a very close spacing of discs, for instance of the order of 0.30 inch. This point, the middle of the up-sweeping portion of the curve, falls approximately at the same relative value of viscosity for most latices of rubber or rubber-like material, whether of natural or synthetic origin. As shown by Fig. 1 this point is in the neighborhood of 20 seconds viscosity on the instrument used in the tests for all three latices.

To effectively carry the concentration further a more widely spaced set of discs is provided, for instance spacings of the order 0.50 inch. With this slightly wider spacing I have been able to carry the concentration to a point well up on the straight portion of the curve. Again, I have found that for most latices, this straightening out of the curve of viscosity versus concentration takes place at substantially the same relative value of viscosity, that of approximately 40 seconds on the instrument used in the tests shown on the graph.

I have further found that when concentration has progressed to the straight portion of the curve of viscosity versus concentration, a spacing substantially wider apart than the other two sets is desirable to carry the dispersion to the final or maximum concentration or to a paste-like consistency. This is possible with a disc spacing of the order of, for example, one inch although wider spacings are not prohibited.

The above-indicated spacings are merely illustrative of the variation of the spacing of the discs in a particular case and should not be construed as limiting the invention to such specific spacing relationship. With at least three sets of discs it is possible to greatly increase the output of a disc-type concentrator, but a desirable increase in range and capacity is enjoyed by using only the first and last sets, omitting the intermediate set. The fact that the curves of viscosity versus concentration are of the same general shape for a variety of latices makes it possible to install a properly chosen set of disc spacings that will handle nearly every latex or rubber dispersion efficiently and cheaply.

The viscosity data embodied in the graphs of Fig. 1 were obtained on a home-made efflux type viscosimeter in which a measured volume of the dispersion was permitted to flow through an orifice in the bottom of a container and the elapsed time in seconds noted. No effort has been made to convert this data to standard viscosity units since no useful purpose would be served. The shape of the curve would be the same whatever the units in which viscosity may be expressed.

The invention will now be described in greater detail with reference to the accompanying drawings, of which:

Fig. 1 is a series of graphs showing the relationship between viscosity and concentration for a group of typical natural and synthetic rubber dispersions as the concentration is progressively increased.

Fig. 2 is a plan view of a preferred embodiment of this invention the view being partly broken away and sectioned for purposes of illustration.

Fig. 3 is a side elevation of the apparatus shown in Fig. 2 partly broken away and in section.

Fig. 4 is a side elevation of a second embodiment of this invention.

Fig. 5 is a section taken on line 5—5 of Fig. 4.

The rotating-disc concentrator of the preferred embodiment illustrated by Figs. 2 and 3 comprises three separate dispersion containing means such as a single tank divided into three separate compartments 10, 11, 12 by vertical bulkheads 13 and 14, the separate compartments being arranged substantially on the same level and preferably kept at elevated temperatures by being inclosed in a common hot water heating jacket 15 or other appropriate heating means. To pick up thin layers of dispersion, three sets of rotating-discs 16, 17, 18 are provided with the discs spaced, respectively, 0.30 inch, 0.50 inch, and 1.0 inch apart and being mounted for rotation on shafts 19, 20, 21 which are mounted for rotation, respectively, in the said separate containing means. Any suitable apparatus such as a blower (not shown) fitted with a steam heater (not shown) forces hot air in the direction indicated past the surfaces of the rotating-discs. An air-tunnel 22 serves to contain and direct the stream of hot air entering at 23 and leaving at 24. A constant unilateral flow of dispersion from each containing means to the next, and throughout the system, is maintained by introducing relatively dilute dispersion through the inlet pipe 25 to the first containing means 10 and allowing successive overflow through the weirs at 26, 27. Relatively concentrated dispersion is withdrawn through the discharge pipe 30. The rate of flow of dispersion through the apparatus is controlled by the inlet valve 31.

The heating jacket 15 is provided with water inlet 33 and an outlet 34. The three dispersion containing compartments are provided with drain plugs 35, 36, 37. An electric motor or other driving means (not shown) acts through sprocket chains 38, 39, 40 and through sprockets 41, 42, 43, 44, 45 to rotate the shafts 19, 20, 21 and the several sets of discs.

The rotating disc concentrator illustrated in the second embodiment illustrated by Figs. 4 and 5 differs from the preferred embodiment in Figs. 2 and 3 principally that the separate containing means 50, 51, 53 are arranged on substantially different levels in stepwise or "cascade" fashion and are kept at elevated temperatures by exposure to the hot-air stream but they may be provided with separate hot water heating jackets as in the preferred embodiment or some other appropriate heating means. To pick up thin layers of dispersion, three sets of rotating discs 55, 56, 57 are spaced and disposed substantially as in the preferred embodiment described above. As in the preferred embodiment a blower (not shown) is used to force hot air past the surface of the rotating discs in the direction indicated. An air tunnel 58 with three take offs 59, 60, 61 and a single air exit 62, conducts the air stream as in the preferred embodiment. A constant flow of dispersion through the apparatus from each containing means to the next is maintained utilizing dispersion conduits 63, 64 to contain the overflow and the force of gravity to maintain movement.

Dilute dispersion enters at 66, and relatively concentrated dispersion is withdrawn at 67. The three separate dispersion-containing means 50, 51, 53 are fitted respectively with drain cocks 69, 70, 71. Valve 72 controls the flow of dispersion to and through the apparatus.

Operation of the preferred embodiment of this invention as illustrated by Figs. 2 and 3 of the drawings is as follows: Relatively dilute dispersion from a reservoir (not shown) is admitted by opening the valve 31 and permitting dispersion to flow through the inlet pipe 25 to the first containing means 10 until it is filled so that the shaft 19 is just in contact with the level of the dispersion. The shafts 19, 20, 21 are then set in rotation and the blast of hot air from the blower is turned on, heat being admitted to the heating jacket 15. The dispersion is permitted to enter slowly to replace evaporated water while the concentration rises to an intermediate point preferably below that point on the graph of concentration versus viscosity at which rapid increases in viscosity occur. Then the valve 31 is opened wider so that a stream of dilute dispersion is admitted to the first container 10 and a continuous overflow is obtained at the weir 26. As dispersion continues to flow the second and third dispersion containing means 11 and 12 will be filled in turn. When the desired level and concentration is reached in the final containing means 12, overflow will occur through the discharge pipe 30. By controlling the position of valve 31 and the temperature of the air stream entering at 23, the dispersion leaving at 31 can be adjusted to a desired final concentration. When the apparatus is once properly adjusted, dispersion will flow continuously through the several containers and emerge in highly concentrated form.

Operation of the second embodiment of Figs. 4 and 5 is closely similar to that of the preferred embodiment as described above and requires no additional explanation.

This invention has made possible the continuous, rapid, and lower cost concentration of a wide variety of natural and synthetic rubber dispersions including uncompounded and compounded dispersions, vulcanized rubber dispersions, and artificially prepared aqueous dispersions of natural and synthetic rubbers with the elimination of operational difficulties and reduction in labor usually necessary to clean latex concentration apparatus.

The dispersions concentrated in this invention may be naturally occurring or artificially prepared aqueous dispersions of natural or synthetic rubbers or rubber-like materials including but not being limited to natural latex, artificial dispersions of natural, synthetic or reclaimed rubber, latices of various synthetic rubbers and rubber-like materials such as the various polymers of butadiene alone or as copolymers with styrene and acrylonitrile or the like and such as Neoprene and Thiokol as well as other analogous dispersions such as aqueous dispersions of asphalt.

While the invention has been described in considerable detail with reference to certain preferred embodiments and procedures, it will be understood that numerous modifications and variations therefrom may be effected without departing from the spirit and scope of the invention as defined in the appended claims.

I claim:

1. Apparatus for concentrating an aqueous dispersion of a colloidally dispersed substance by repeatedly exposing the dispersion in thin layers on surfaces exposed to evaporative conditions, such apparatus comprising dispersion containing means, a plurality of sets of spaced-apart surfaces arranged for repeated immersal in the dispersion at each of a plurality of segregated zones in the containing means, said surfaces being spaced farther apart in successive zones as the viscosity of the dispersion increases with concentration, means for continuously introducing relatively dilute dispersion to one of said zones, means for continuously withdrawing relatively concentrated dispersion from another of such zones and means for maintaining a substantially unidirectional continuous flow from the zone to which the dilute dispersion is added to the zone where the relatively concentrated dispersion is withdrawn.

2. Apparatus for concentrating an aqueous dispersion of a colloidally dispersed substance by repeatedly exposing the dispersion in thin layers on surfaces exposed to evaporative conditions, such apparatus comprising a plurality of separate dispersion containing means arranged in series, a plurality of sets of spaced-apart surfaces respectively arranged for repeated immersal in dispersion contained by the plurality of dispersion containing means, said surfaces being spaced progressively farther apart in successive containing means as the viscosity of the dispersion increases with concentration, means for continuously introducing relatively dilute dispersion into one of said separate containing means, means for continuously withdrawing relatively concentrated dispersion from another of such separate containing means and means for maintaining a substantially unidirectional continuous flow from the containing means to which the dilute dispersion is added through the series, to the containing means from which the relatively concentrated dispersion is withdrawn.

3. Apparatus for concentrating an aqueous dispersion of a colloidally dispersed substance by repeatedly exposing the dispersion in thin layers on surfaces exposed to evaporative conditions, such apparatus comprising a plurality of separate dispersion containing means arranged in series, said separate containing means being arranged on substantially different levels, a plurality of sets of spaced-apart surfaces respectively arranged for repeated immersal in dispersion contained by the plurality of dispersion containing means, said surfaces being spaced progressively farther apart in successive containing means as the viscosity of the dispersion increases with concentration, means for continuously introducing relatively dilute dispersion to one of the separate containing means at a relatively high level, means for continuously withdrawing relatively concentrated dispersion from another of such separate containing means at a substantially lower level and means for flowing the dispersion continuously downward from the separate containing means to which the dilute dispersion is added to the separate containing means from which the concentrated dispersion is withdrawn.

4. Apparatus for concentrating an aqueous dispersion of a colloidally dispersed substance by repeatedly exposing the dispersion in thin layers on surfaces exposed to evaporative conditions, such apparatus comprising a plurality of separate dispersion containing means, said containing means being arranged substantially on the same level, a plurality of sets of spaced-apart surfaces respectively arranged for repeated immersal in dispersion contained by the plurality of dispersion containing means, said surfaces being spaced progressively farther apart in successive containing means as the viscosity of the dispersion in the containing means increases with concentration, means for continuously introducing relatively dilute dispersion to one such separate containing means, means for continuously withdrawing relatively concentrated dispersion from another such separate containing means and means for maintaining a substantially unidirectional continuous flow from the containing means to which the dilute dispersion is added through the series to the containing means from which the concentrated dispersion is withdrawn.

5. Apparatus for concentrating an aqueous dispersion of a colloidally dispersed substance by repeatedly exposing the dispersion in thin layers on surfaces exposed to evaporative conditions, such apparatus comprising at least three separate dispersion containing means arranged in series, at least three sets of spaced-apart surfaces respectively arranged for repeated immersal in dispersion contained by the three dispersion containing means, said surfaces being spaced progressively farther apart in successive containing means as the viscosity of the dispersion increases with concentration, means for continuously introducing relatively dilute dispersion to one such separate containing means, means for continuously withdrawing relatively concentrated dispersion from another such separate containing means and means for maintaining substantially unidirectional continuous flow from the containing means to which the dilute dispersion is added through the series to the containing means from which the concentrated dispersion is withdrawn.

6. Apparatus for concentrating an aqueous dispersion of a colloidally dispersed substance by repeatedly exposing the dispersion in thin layers on surfaces exposed to evaporative conditions, said apparatus comprising a series of spaced-apart surfaces arranged for repeated alternating immersal in the dispersion and exposure to evaporative conditions, said surfaces being spaced relatively close together in one zone of the series and relatively far apart in another zone of the series, means for introducing relatively dilute dispersion into the first mentioned zone, and means for withdrawing relatively concentrated dispersion from the second mentioned zone, the two zones being in communication for flow of dispersion from the first mentioned zone to the second mentioned zone.

7. In a method for continuously concentrating an aqueous dispersion of a colloidally dispersed substance, the process which comprises repeatedly immersing in the dispersion and exposing to evaporative conditions a plurality of spaced-apart surfaces, the spaces between the surfaces increasing progressively as the concentration of the dispersion increases.

8. In a method for continuously concentrating an aqueous dispersion of a colloidally dispersed substance, the process which comprises setting up a substantially unilateral flow of the dispersion and in the course of such flow progressively evaporating water from the dispersion at a plurality of spaced-apart and effectively segregated zones by repeatedly spreading the dispersion in such zones on a plurality of surfaces, the spaces between the surfaces in successive zones being progressively wider.

9. A method of concentrating a colloidal dispersion of a colloidally dispersed substance which comprises repeatedly spreading the dispersion on a series of spaced-apart surfaces exposed to evaporative conditions and which are spaced relatively close together until concentration of the dispersion has progressed to a point on the upsweeping portion of the concentration versus viscosity graph for the particular dispersion on which the concentrations are plotted as abscissae and the viscosities are plotted as ordinates, and thereafter subjecting the dispersion to further concentration by repeatedly spreading it on a series of surfaces spaced more widely than the first set until the viscosity of the dispersion reaches the desired concentration.

10. A method of concentrating a colloidal dispersion of a colloidally dispersed substance which comprises repeatedly spreading the dispersion on a series of spaced-apart surfaces exposed to evaporative conditions and which are spaced relatively close together until the concentration has progressed to a point where the dispersion has a viscosity represented by a point on the upsweeping portion of the concentration versus viscosity graph for the particular dispersion on which the concentrations are plotted as abscissae and the viscosities are plotted as ordinates, and thereafter subjecting the dispersion to further concentration by repeatedly spreading it on a series of surfaces exposed to evaporative conditions and which are spaced more widely than the first set until the viscosity of the dispersion reaches a point on the generally vertical portion of the same concentration versus viscosity graph, and finally subjecting the dispersion to still further concentration by repeatedly spreading it on a third series of surfaces exposed to evaporative conditions and spaced still more widely apart until the dispersion reaches the desired concentration.

11. Apparatus for concentrating liquid material having an evaporatable vehicle by repeatedly exposing the liquid material in thin layers on surfaces exposed to evaporative conditions, said apparatus comprising containing means for the liquid material, a plurality of sets of spaced-apart surfaces arranged for repeated immersal in the liquid material at each of a plurality of segregated zones in the containing means, said surfaces being spaced farther apart in successive zones as the viscosity of the liquid material increases with concentration, means for continuously introducing relatively dilute liquid material to one of said zones, means for continuously withdrawing relatively concentrated liquid material from another of said zones, and means for maintaining and directing continuous progressive flow of said liquid material from the zone where the relatively dilute liquid material enters to the zone where the relatively concentrated liquid material is withdrawn, said flow being generally crosswise of said surfaces and in generally opposite directions in at least two successive said zones.

12. In a method for continuously concentrating liquid material having an evaporatable vehicle, the process which comprises repeatedly immersing in the liquid material and exposing to evaporative conditions a plurality of spaced-apart surfaces, the spaces between the surfaces increasing progressively as the concentration of the liquid material increases, and maintaining flow of said liquid material from the closer spaced surfaces toward the wider spaced surfaces, said flow being continuously progressive in character and in direction generally crosswise of said surfaces.

HARRY W. TAUSCH.